United States Patent
Ott

(10) Patent No.: US 7,416,224 B2
(45) Date of Patent: Aug. 26, 2008

(54) SLIDING RING FIXING

(75) Inventor: Stephan Ott, Wiesbaden (DE)

(73) Assignee: GAT Gesellschaft fur Antriebstechnik mbH, Wiesbaden (DE)

( * ) Notice: Subject to any disclaimer, the term of this patent is extended or adjusted under 35 U.S.C. 154(b) by 345 days.

(21) Appl. No.: 11/040,087

(22) Filed: Jan. 21, 2005

(65) Prior Publication Data

US 2005/0161885 A1 Jul. 28, 2005

(30) Foreign Application Priority Data

Jan. 22, 2004 (DE) ............... 10 2004 003 459

(51) Int. Cl.
- *F16L 27/08* (2006.01)
- *F16L 39/04* (2006.01)
- *F16J 15/34* (2006.01)

(52) U.S. Cl. ............ 285/121.1; 285/121.5; 277/375; 277/397

(58) Field of Classification Search ............ 285/13, 285/14, 121.5, 349, 924, 98, 99, 121.1, 121.2, 285/121.3, 121.4; 277/370, 375, 390, 397, 277/404, 405

See application file for complete search history.

(56) References Cited

U.S. PATENT DOCUMENTS

| | | | | | |
|---|---|---|---|---|---|
| 1,985,349 | A | * | 12/1934 | Kelly | 285/81 |
| 2,362,436 | A | * | 11/1944 | Stratford | 277/396 |
| 2,459,956 | A | * | 1/1949 | Muller | 285/322 |
| 2,601,996 | A | * | 7/1952 | Sefren | 277/393 |
| 2,649,317 | A | * | 8/1953 | Leuze | 277/370 |
| 3,101,200 | A | * | 8/1963 | Tracy | 277/399 |
| 3,116,067 | A | * | 12/1963 | Kinzie et al. | 277/390 |
| 3,454,288 | A | * | 7/1969 | Mancusi, Jr. | 285/98 |
| 3,522,948 | A | * | 8/1970 | Maccrum | 277/360 |
| 3,578,345 | A | * | 5/1971 | Copes | 277/370 |
| 3,997,198 | A | * | 12/1976 | Linder | 285/98 |
| 4,079,969 | A | * | 3/1978 | Wilson et al. | 285/98 |
| 4,296,952 | A | * | 10/1981 | McCracken | 285/98 |
| 4,478,435 | A | * | 10/1984 | Cheshier et al. | 285/39 |
| 4,483,540 | A | | 11/1984 | Bordien et al. | |
| 4,632,431 | A | * | 12/1986 | McCracken | 285/13 |
| 4,700,953 | A | * | 10/1987 | Kuusela et al. | 277/370 |
| 4,817,995 | A | * | 4/1989 | Deubler et al. | 285/98 |
| 5,669,636 | A | * | 9/1997 | Kubala | 285/98 |

(Continued)

FOREIGN PATENT DOCUMENTS

DE 19 29 312 A1 6/1969

(Continued)

*Primary Examiner*—James M Hewitt
(74) *Attorney, Agent, or Firm*—Paul & Paul

(57) ABSTRACT

A device for fixing the sliding ring of an axial sliding ring seal for an axial rotary transmission leadthrough to a sliding ring support includes a conically tapered radial outer casing surface of the sliding ring and a holding apparatus designed as a cap nut and has a threaded section which can be screwed onto a matching external thread in the end area of the sliding ring support and also has a holding section which has a conically running internal surface which is matched to the conical casing surface of the corresponding sliding ring. The device has a higher degree of reliability and durability and is sufficiently space-saving to be able to replace existing rotary transmission leadthroughs in which the sliding rings are glued to the sliding ring supports.

20 Claims, 8 Drawing Sheets

Figure 3:
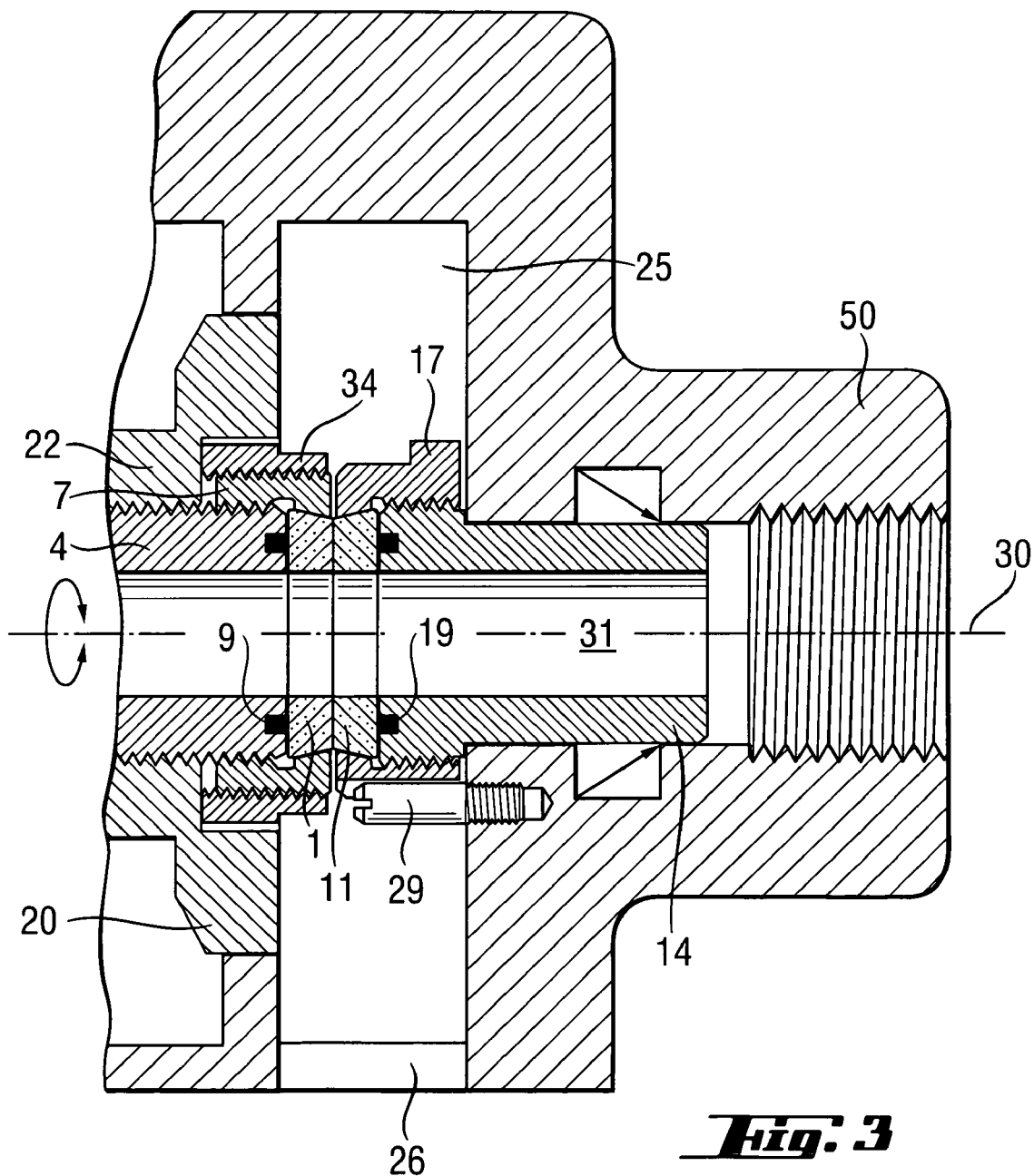

U.S. PATENT DOCUMENTS 6,007,105 A * 12/1999 Dietle et al. .................. 285/94
6,412,822 B1 * 7/2002 Omiya et al. ............. 285/121.3

FOREIGN PATENT DOCUMENTS

| | | | |
|---|---|---|---|
| DE | 32 06 080 A1 | 2/1982 | |
| DE | 32 39 855 A1 | 10/1982 | |
| JP | 05133491 A * | 5/1993 | |

* cited by examiner

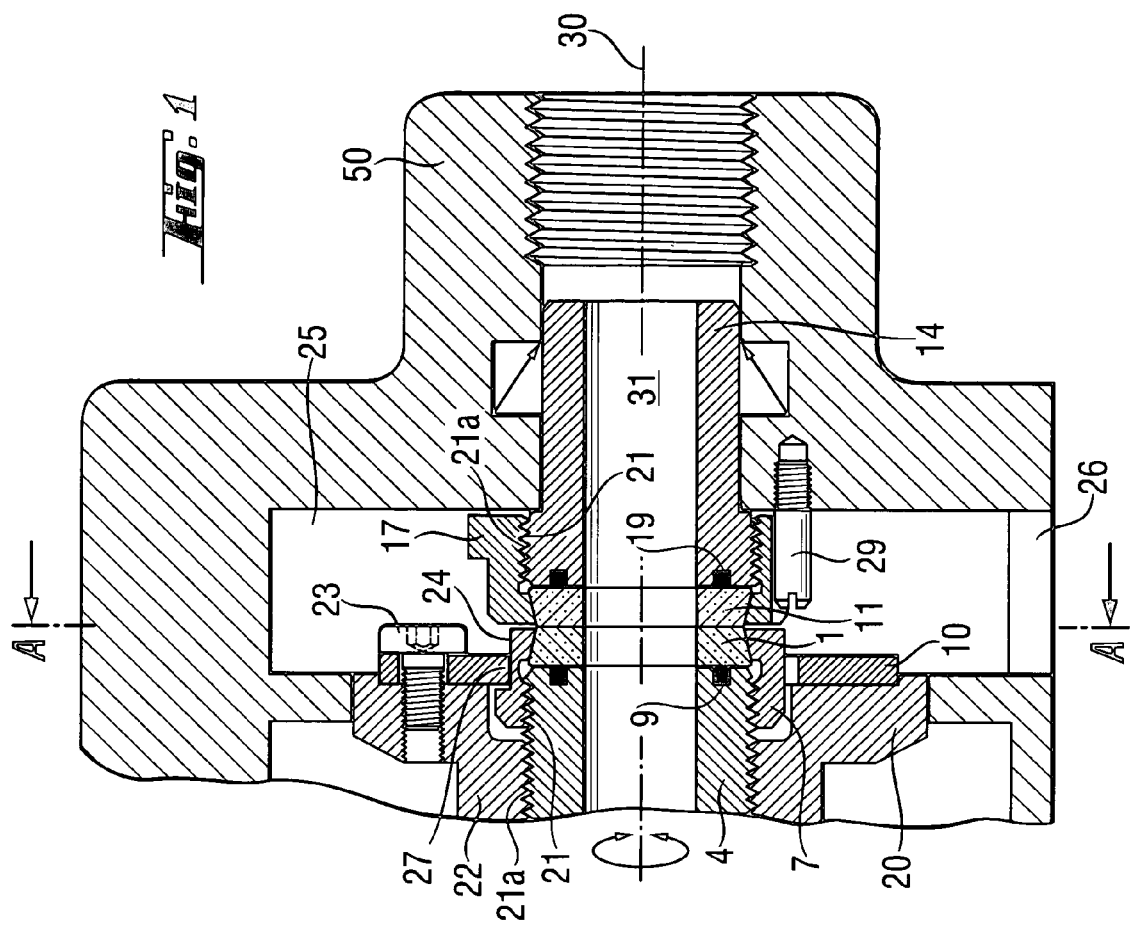
Fig. 1
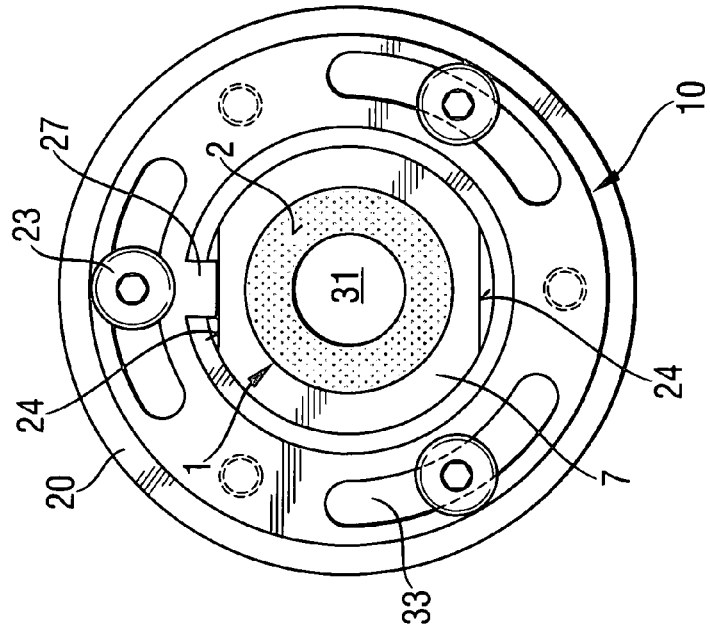
Fig. 2 (A-A)

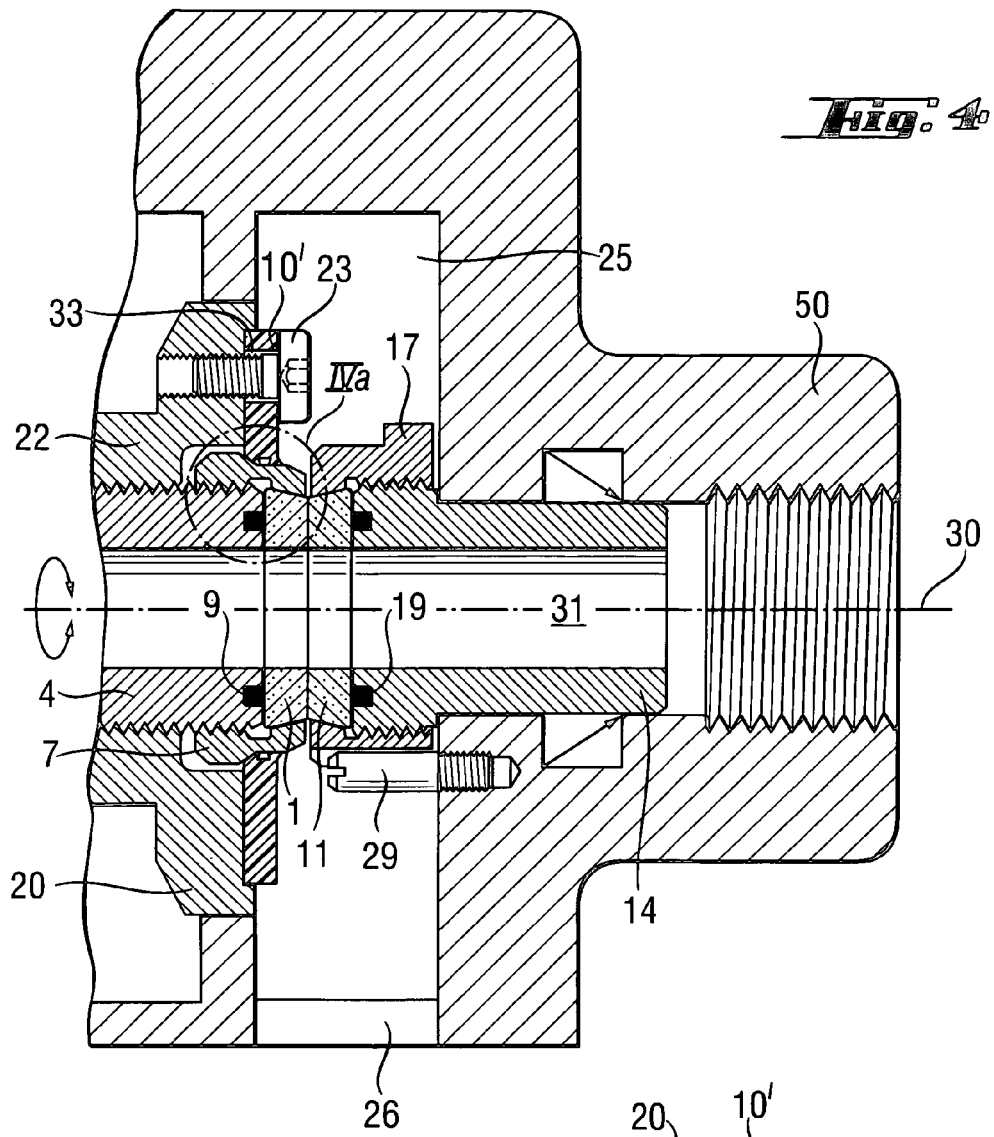
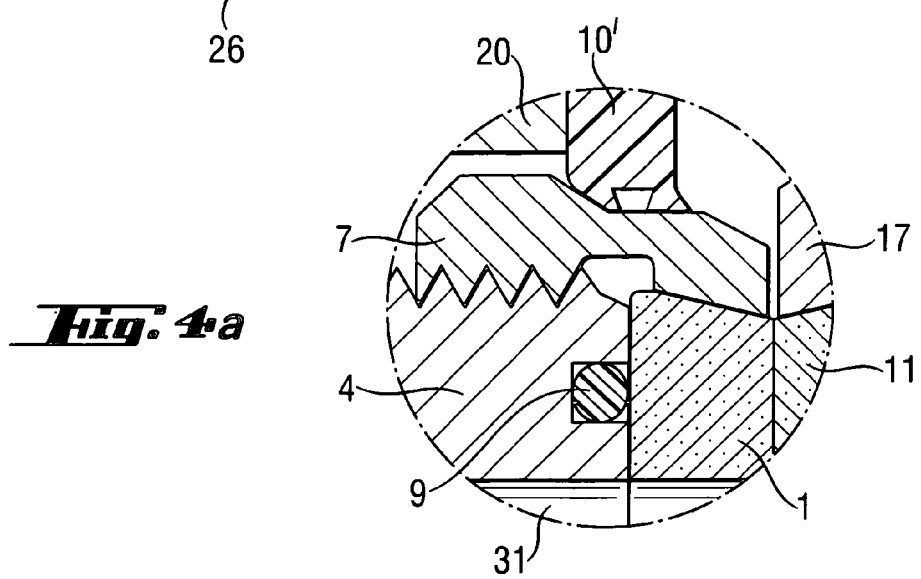

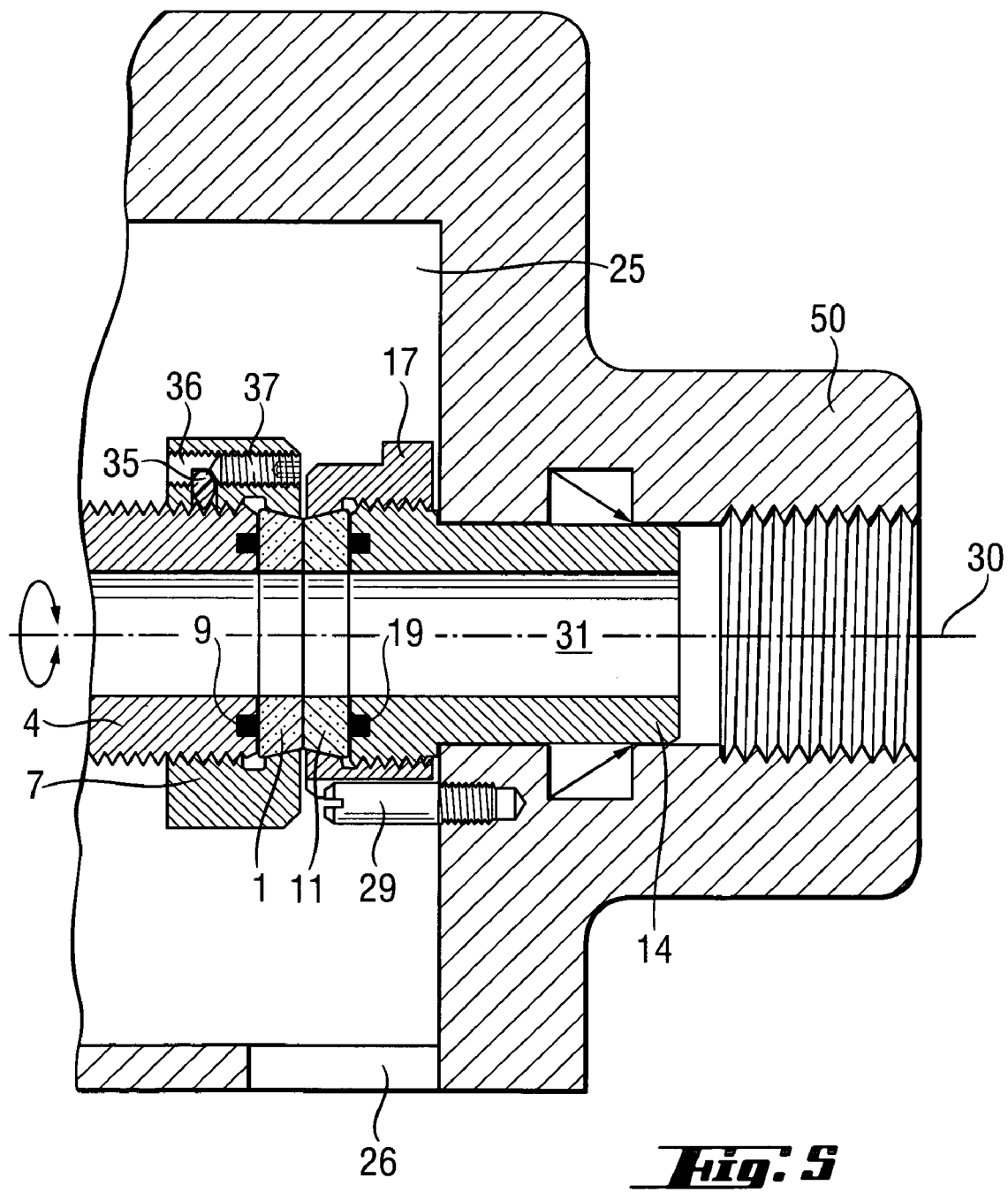

SLIDING RING FIXING

The present invention relates to a device for fixing a sliding ring of a sliding ring seal of an axial rotary transmission leadthrough with the following features:

a) a sliding ring which has a sliding sealing surface and a first contact surface facing away from the sliding sealing surface, b) a sliding ring support with a second contact surface for tight connection with the first contact surface of the sliding ring and c) a holding apparatus which secures the sliding ring securely to the sliding ring support by bringing the first contact surface and the second contact surface into tight engagement with each other.

Such devices usually consist of a simple glued join. In other words, the sliding ring is glued with its first contact surface to the suitably designed second contact surface of the sliding ring support.

Axial rotary transmission leadthroughs generally consist of a stationary and a rotating machine part each of which has bores or passages parallel and in particular concentric to the axis of rotation of the rotating machine part, the transition between the stationary and the rotating machine part being sealed off by sliding rings in contact with one another which are generally arranged concentric or almost concentric to the axis of rotation. These sliding rings generally have flat sliding sealing surfaces each of which is formed by one of the end surfaces of the sliding rings and which, with correct alignment of the sliding ring supports on the stationary and rotating machine part lie tightly and flush on top of one another. During a rotation of the rotating machine part, the sliding ring secured to the sliding ring support of the rotating machine part also rotates with it while the sliding ring secured to the stationary machine part does not rotate. Consequently, the sealing surfaces in contact with each other slide on one another and for this reason are also called "sliding sealing surfaces". The friction is to be as small as possible because otherwise, in particular at high speeds, a great deal of frictional heat would be produced which could lead to the destruction of the sliding rings or also to jamming and to the destruction of other machine parts.

Some leakage for the fluid fed through the rotary transmission leadthrough is unavoidable in the area of the sliding ring seal, in particular if the sliding ring supports are exposed to vibrations, which is unavoidable with a rapid rotation of one of the sliding ring supports. Above all, this is also the case because fluids must be fed through such rotary transmission leadthroughs often at a high pressure of up to several hundred bar.

However such leakage is also definitely desirable to a certain extent because many fluids have lubricating properties and thus reduce the friction between the sealing surfaces, sliding on top of one another, of the two sliding rings and because fluids also have in particular a cooling action and the fluid passing through the leak or between the two sealing surfaces of the sliding rings at least partly removes the frictional heat between the sliding rings.

For this reason corresponding rotary transmission leadthroughs are as a rule also equipped with a leakage space, surrounding the sealing area, in which the fluid emerging through the leak, e.g. a water/oil emulsion for the lubrication of cutting tools, is collected and removed in controlled manner, or recycled into a corresponding reservoir.

As already mentioned, with such so-called "axial rotary transmission leadthroughs", the sliding rings are glued onto the corresponding sliding ring supports which typically (at least on the side of the rotating machine part) are hollow-cylindrical components, to their annular end faces. This is not completely without problems because the components in question, namely the sliding ring supports and the sliding rings themselves, must be manufactured very precisely and in particular must have very exactly plane-parallel end faces so that the sliding ring surfaces can also lie and glide on top of one another exactly and without overloading on one side.

Therefore the adhesive layer must under no circumstances vary in thickness and is preferably very thin.

However, it has also been shown that, in particular when using certain fluids, the glues known and used to date are dissolved sooner or later. This may also be due in part to the fact that a certain amount of frictional heat is unavoidable and the sliding rings and also the sliding ring supports heat up correspondingly, the supplied fluids also definitely being supplied at a higher temperature under certain circumstances. In some applications therefore the glued joints are not indefinitely adequate for the corresponding loads, the result being that a sliding ring becomes detached from the associated sliding ring support and can very easily lead to massive damage to or destruction of the whole rotary transmission leadthrough and the adjacent machine parts.

On the other hand however these glued joints have the decisive advantage that they are very space-saving, as they do not require any additional space for fixing the sliding rings to the sliding ring supports than is already occupied by the sliding ring and the sliding support themselves. The thickness of the adhesive layers is generally negligible.

Moreover, many corresponding machines are already equipped with axial sliding ring seals which have corresponding glued joints.

Against this background the object of the present invention is therefore to create a device for fixing a sliding ring of an axial sliding ring seal to a sliding ring support, which has a higher degree of reliability and durability and which is nevertheless sufficiently space-saving to be able to replace existing rotary transmission leadthroughs in which the sliding rings are glued to the sliding ring supports with an improved rotary transmission leadthrough which can be used as a replacement instead of the current rotary transmission leadthroughs.

This object is achieved in that the device also has the following features:

d) the radially outer casing surface of the sliding is, starting from the transition to the first contact surface, designed conically tapered in the direction of the transition to the sliding sealing surface, e) the holding apparatus is designed as a cap nut and has a threaded section which can be screwed onto a matching external thread in the end area of the sliding ring support and also has a holding section which has a conically running internal surface which is matched to the conical casing surface of the corresponding sliding ring.

It has been shown that in this way a durable and secure join between the sliding ring and the sliding ring support can be created. A corresponding cap nut can be designed axially very short so that it needs almost no additional space, particularly as the area surrounding the sealing rings in radial direction is in any case typically formed by a leakage space in which additional elements such as such a cap nut immediately have room.

The conical surfaces engaging with each other of the sealing ring and of the cap nut have the advantage that sealing ring and cap nut wedge against each other and the sealing ring is thus not rotated vis-à-vis the cap nut if it enters into sliding engagement with the opposite sealing ring. At the same time, the conical surfaces engaging with each other and the screwing on of the cap nut onto the external thread of the sliding ring support combine to press the first contact surface of the sliding ring firmly onto the second contact surface of the sliding ring support, with the result that here also a frictional engagement occurs which is tight on the one hand and also mechanically firm on the other, with the result that sliding ring support, sliding ring and cap nut together form a compactly cohering, firm unit.

In the preferred version, the sliding ring consists of a ceramic material. It is however also possible to make corresponding sliding rings from metal material, in particular from metal alloys or also from so-called hard metals. Like ceramics, the latter have the advantage of a very great wear resistance and they can be selected in a targeted manner in respect of low friction. Naturally it is also conceivable to use two sliding rings of different materials for one and the same sliding ring seal in order to reduce still further the friction between these sliding rings.

In order, in particular when using fracture-prone materials such as e.g. ceramic sealing rings or also sealing rings made of hard metals, not to have to generate excessive contact forces so that the joints between the first and second contact surfaces becomes tight, it is provided according to the invention that an O-ring is arranged as seal between these contact surfaces. Expediently the second contact surface of the sliding ring support has an annularly circumferential groove the cross-section of which is designed for an at least partial housing of a corresponding O-ring. By pressing the sliding ring with its first contact surface against the second contact surface, a tight engagement with the O-ring is then produced which is pushed fully or almost completely into the groove of the second contact surface, but remains in contact with both surfaces (the base of the groove being regarded as part of the second contact surface).

Furthermore a version of the invention is preferred in which the cone angle of the conical surface of the sealing ring and likewise of the corresponding conical internal surface of the holding section of the cap nut, each relative to the central axis of the ring or the nut, has a value between 3° and 15°, preferably between 5° and 10°. It has been shown that, when these ranges are observed, at least when using ceramic sealing rings, a good wedging effect can still be achieved on the one hand and the cap nut can be tightened with reasonably manageable torques on the other hand without the sealing ring thus being exposed to an excessive load.

However it has been shown that even such a force-locking connection, securely wedged by frictional engagement via conical surfaces and also via the engagement with an O-ring, of the elements concerned can still become detached under extreme external conditions because vibrations and accelerations, in particular slowing and/or starting of the rotation movement, cause the cap nut to rotate vis-à-vis the sealing ring support and the threaded engagement between these two parts thus to loosen, with the result that the engagement between all the other surfaces of the sliding ring, the cap nut and the sliding ring support or O-ring is also loosened. This applies all the more so when, with a view to saving space and to exchangeability of the rotary transmission leadthrough vis-à-vis other or earlier rotary transmission leadthroughs, the cap nut must be kept axially relatively short so that where possible only a few threads are available in order to fix the cap nut to the sliding ring support.

A preferred version of the present invention therefore provides that in addition an anti-rotation device is provided for the cap nut. It is understood that such an anti-rotation device would also be useful and advantageous if the sliding sealing ring were secured to the sliding ring support, not via an engagement of conical surface, but in some other manner with the help of a nut, for example via a clamping of planar surfaces which e.g. run perpendicular to the axis of rotation. This also applies to the variants of anti-rotation devices specified in more detail below.

In a preferred version of the invention the anti-rotation device is designed as annular locking washer, enclosing the cap nut, which is secured to a part, enclosing the sliding ring support, which is moreover connected to the sliding ring support, and is in blocking engagement with the cap nut.

The locking washer could simply be in frictional engagement with the outside of the cap nut, being made for example from a plastic material which has inwardly-projecting engagement lips which define an internal diameter of the locking washer which is clearly smaller than the external diameter of the cap nut. Such a locking washer could also be in form-locking engagement with the outside of the cap nut provided the outside does not have a circular cross-section.

In the case of a particularly preferred version of an anti-rotation device, according to the invention, the cap nut has on its outside at least one flattened section or recess while the anti-rotation device has at least one projection or cam which projects radially inwards and can be brought into engagement with the recess and/or flattened section on the outside of the cap nut, the locking washer for its part being secured to a part securely connected to the sliding ring support and surrounding an end area of the sliding ring support.

The locking washer is expediently balanced with regard to a rotation about its axis which coincides with the axis of rotation of the rotating machine part. This is, of course, necessary only insofar as this locking washer is secured to the sliding ring support of the rotating machine part. A correspondingly balanced design of the locking washer is naturally not required if the cap nut engages with the sliding ring support of a stationary machine part.

Moreover, a version of the invention is particularly preferred in which the locking washer is made of a homogeneous, sheet-like or lamellar material and has an at least two-fold axis of symmetry which extends perpendicular to the plane of this sheet-like material, it being sufficient if in each case only sections of the locking washer which correspond to one another have such a symmetry. This means that the locking washer or the individual elements or corresponding sections of a locking washer are designed symmetrical, at least in respect of a rotation of 180° about their axis, and with correspondingly multiple (n-fold) axes of symmetry the locking washer is designed symmetrical in respect of a rotation of a corresponding fraction 1/n of 360°, n corresponding to the symmetry number.

As a result of such a symmetrical design in the case of a sealing ring of homogeneous material, a locking washer is automatically obtained which is balanced in respect of rotations about its axis which is simultaneously its axis of symmetry.

However, balanced locking washers are also obtained if in each case only individual elements of the locking washer have a multiple axis of symmetry (n≧2) without the washer having a multiple axis of symmetry overall.

Further preferred variants of a securing of the cap nut can be realized by using stud bolts which are screwed into axis-parallel or also radial threaded bores in the casing of the cap nut. The simplest variant is a stud bolt which is screwed in through a radial bore through the casing of the cap nut and is thus brought into secure engagement with the external thread of the sliding ring support. Other variants provide for plastic elements which are either introduced through a corresponding radial bore in the casing of the cap nut or inserted into a recess provided in the internal surface (in the threaded area) of the cap nut, an axis-parallel threaded bore extending through the casing of the cap nut and intersecting with the corresponding recess or radial bore, with the result that a stud bolt screwed into the threaded bore presses the element inserted into the cross-bore or recess radially inwards against the thread of the sliding ring support in order to secure the cap nut against a rotation. Another variant consists of using a counter-nut, the cap nut being provided with an external thread and the counter-nut having a corresponding internal thread which, once the cap nut is screwed onto the external thread of the sliding ring support, is screwed onto the cap nut until the counter-nut rests against a part which is secured to the sliding ring support and surrounds its end section.

Finally a further variant would also be conceivable in which a pointed bar located directly below the cap nut engages with the external thread of the sliding ring support, the bar being connected to an axial tension bolt extending across it which extends through an axial bore in the casing of the cap nut and is fixed by a nut in position in which the bar is rotated into engagement with the external thread of the sliding ring support.

Further advantages, features and possible applications of the present invention are made clear by means of the following description of preferred versions and the associated figures. There are shown in:

FIG. 1 an axial longitudinal section through the sealing area of a rotary transmission leadthrough with locking washer for a cap nut, FIG. 2 a top view of the locking washer shown in section in FIG. 1, FIG. 3 a variant in which a counter-nut is screwed onto an external thread of the cap nut, FIG. 4 a variant in which a locking washer is in frictional engagement with the outside of a cap nut, FIG. 4a a part enlarged in scale as indicated by IV in FIG. 4

Figure 6:
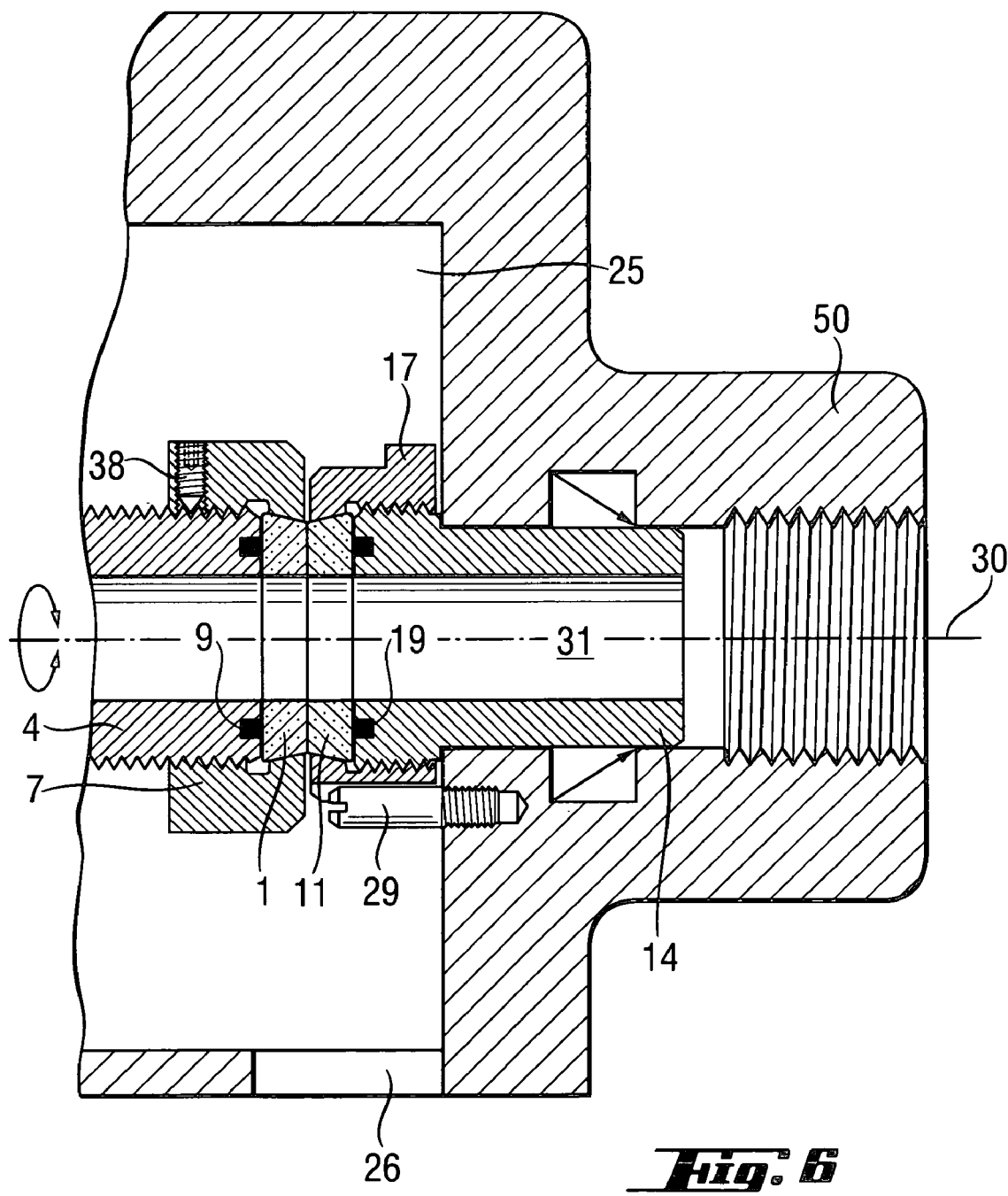
Figure 7:
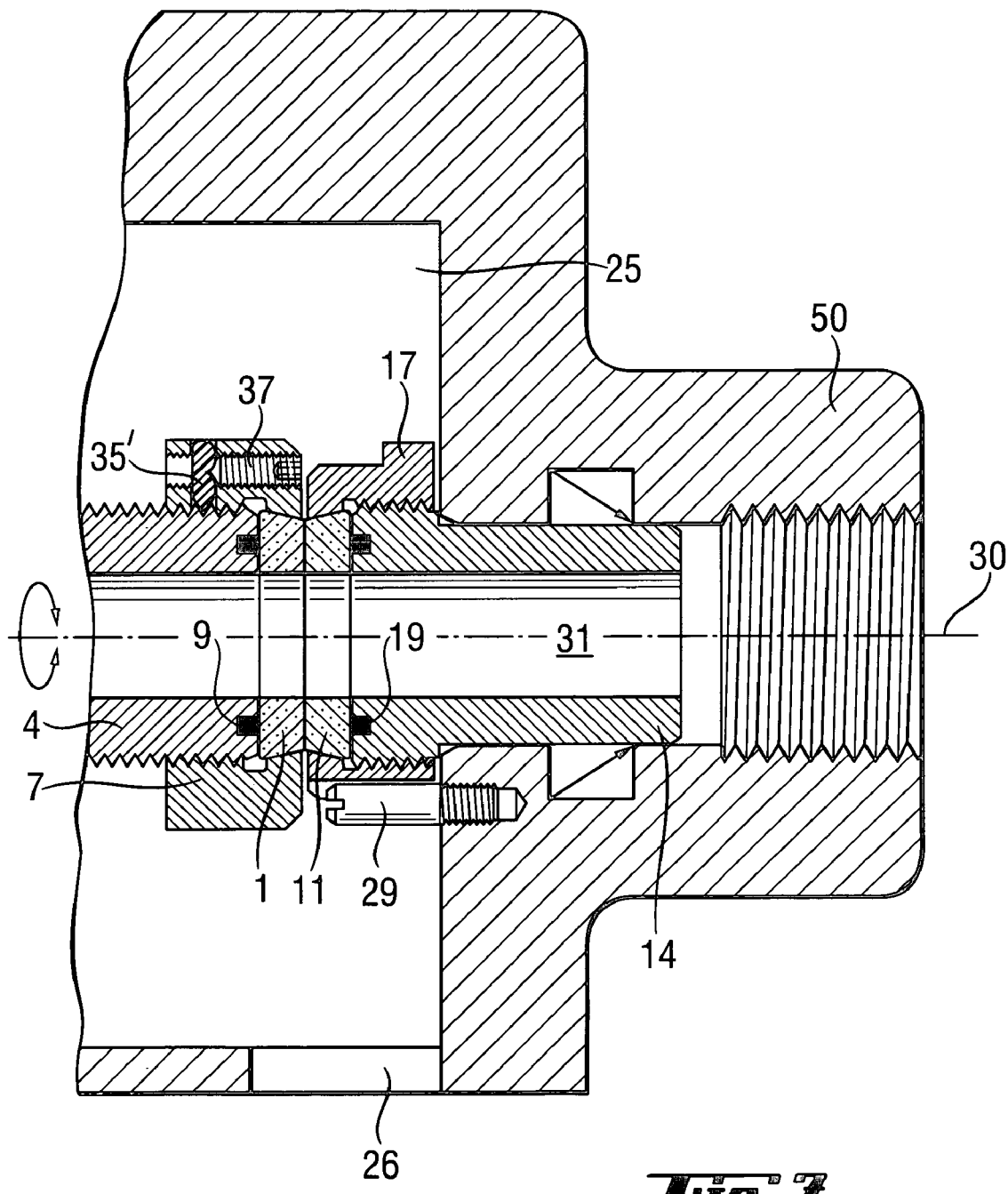
Figure 8:
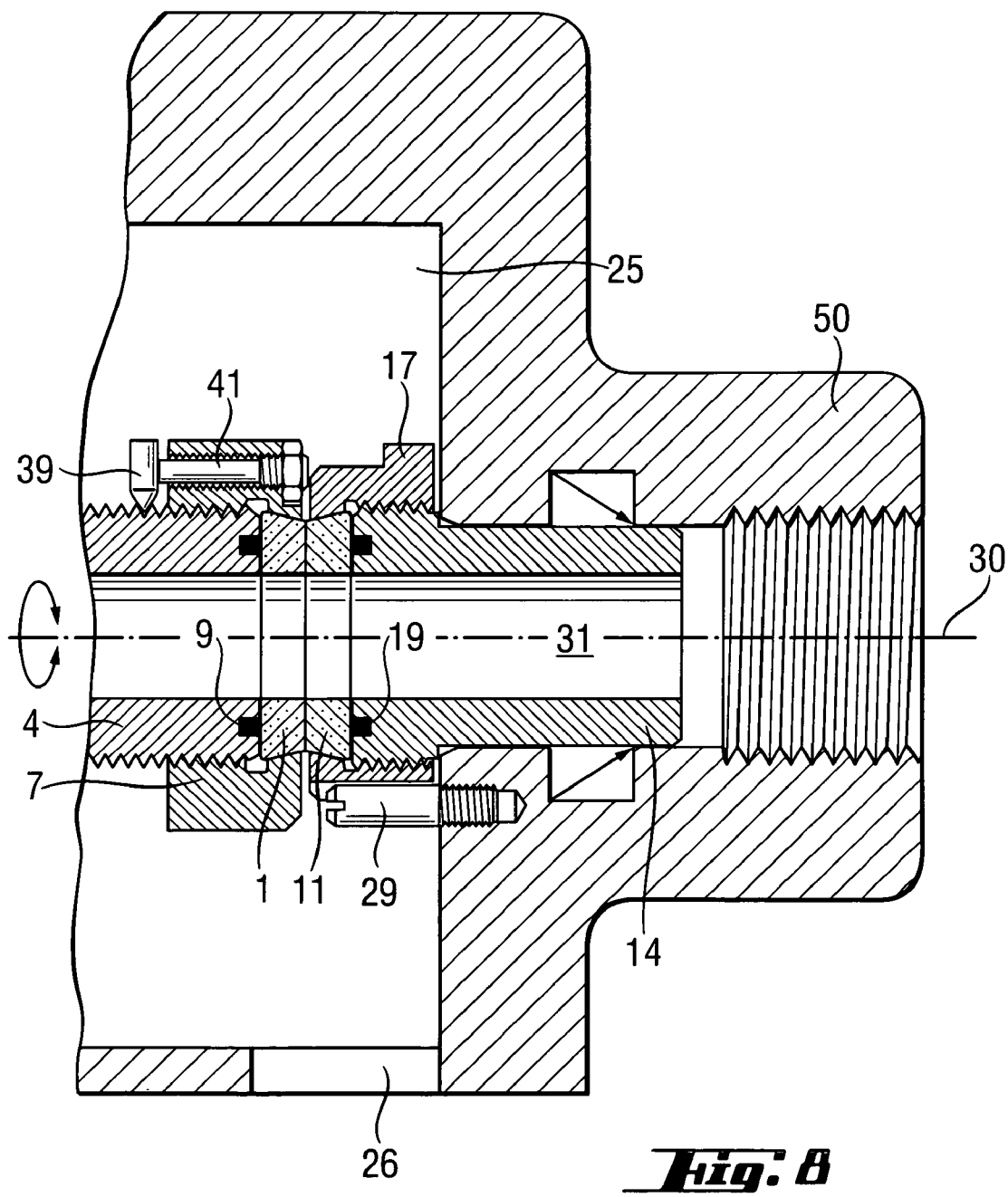
Figure 9:
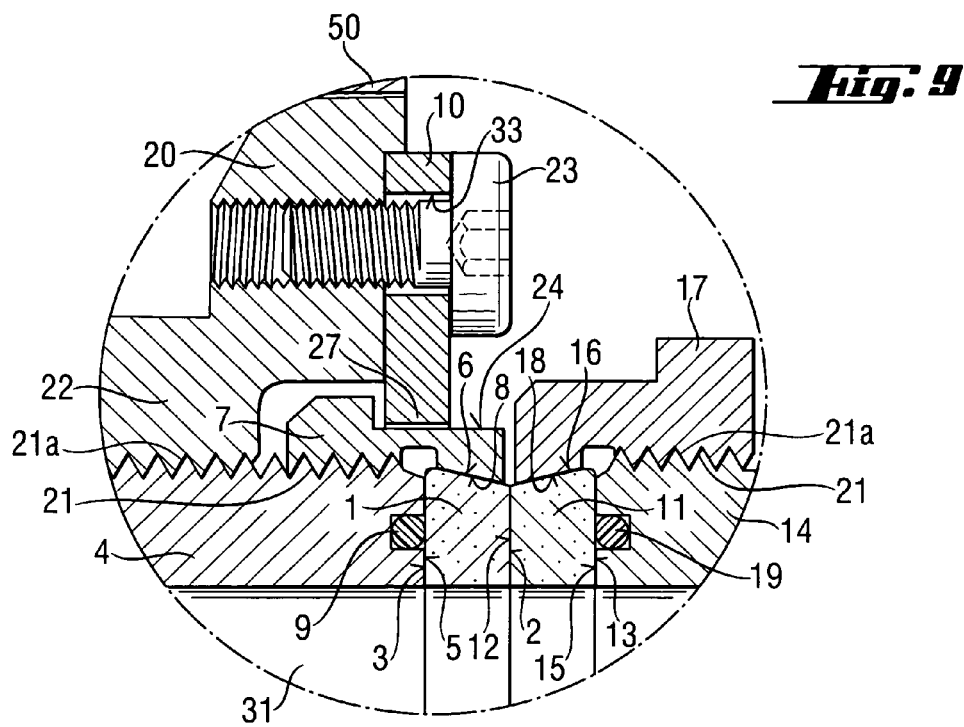
Figure 10:
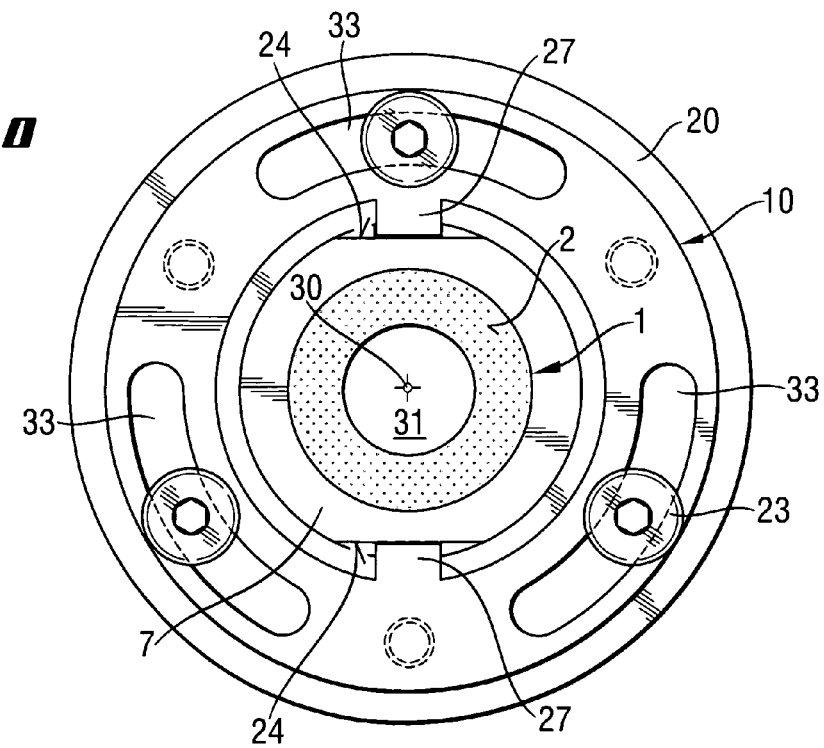

FIG. 5 a variant in which a displacement element lies in the recess of the internal surface of the cap nut and is brought into engagement with the thread of the sliding ring support by an axial stud bolt, FIG. 6 a variant with a radial stud bolt, FIG. 7 a variant similar to the example in FIG. 5, but with the displacement element being introduced through a radial bore, FIG. 8 a variant with a pointed bar axially outside the cap nut and an axial tension bolt extending through the casing of the nut, FIG. 9 an enlarged section area of the seal and locking washer in FIG. 1, and FIG. 10 another top view of a locking washer similar to FIG. 2 but with symmetrically arranged cams.

Firstly, FIGS. 1, 2 and 9 and 10, which relate to the same version, will be described together, reference firstly being made to FIG. 9 in which the different surfaces engaging with one another are most easily recognizable.

Two sliding ring supports 4, 14 can be seen in FIG. 9, the sliding ring support 4 in this case being the end section of a rotatably housed shaft, i.e. forming part of the rotating machine part, while the sliding ring support 14, while likewise a hollow-cylindrical component, is however mounted securely in a stationary machine part, optionally also axially displaceable and pretensioned in the direction of the rotating machine part.

A sliding ring 1 or 11 is secured to each of the two hollow-cylindrical sliding ring supports 4, 14. The sliding ring 1 or 11 is pressed by a cap nut 7 or 17 in each case onto the annular, end-face contact surface 5 or 15 of the sliding ring support 4 or 14. For this, the conical internal surfaces 8 or 18 of the two cap nuts 7 or 17 come into contact with the correspondingly conically designed external casing surfaces 6 or 16 of the sliding rings 1 or 11 when the cap nuts 7 or 17 are screwed onto the corresponding external threads of the sliding ring supports 4 or 14.

The contact surfaces 5 and 15 each have a groove the depth of which is dimensioned such that they each partly house an O-ring 9, 19 with the result that the O-ring introduced into the groove still projects slightly over the adjacent sections of the contact surfaces 5, 15. When the cap nuts 7, 17 are tightened, the sliding rings 1, 11 are accordingly brought into contact with their first contact surfaces 3, 13 firstly with the projecting surface of the O-rings 9, 19, the O-rings 9, 19 are pressed further together upon further tightening of the cap nuts 7, 17 until finally the first contact surfaces 3, 13 engage with the respective opposite second contact surfaces 5, 15 of the sliding ring supports 4, 14. In order to achieve a secure sealing engagement and in order on the other hand not to load the sliding rings disproportionately, the cap nuts 7, 17 are screwed tight with a defined torque. In this way it is ensured that the contact surfaces 3, 5 or 13, 15 close tightly with each other with the O-rings 9 or 19 lying in between with the result that a tight and secure connection forms between the sliding ring and the respective sliding ring support allocated to it along the respective first and second contact surfaces without the sliding sealing rings 1, 11, which are at times made of fracture-prone materials, being damaged or too greatly loaded or disproportionately tensioned by the occurring compression forces produced.

The two sliding ring supports 4, 14 are aligned exactly along the common axis and at least one of the parts should be slightly axially pre-tensioned vis-à-vis the other in order that the sliding sealing surfaces 2, 12 come to rest against each other as uniformly as possible over a large area in order to allow a relative movement between the sliding rings 1 and 11 with the smallest possible friction and yet simultaneously closing as tightly as possible.

The rotating machine part or the sliding ring support 4 which is generally designed as a rotating shaft can then rotate about its axis 30, the sliding sealing surfaces 2, 12 sliding on one another while still offering a fairly tight closure between the stationary and rotating machine parts. A certain quantity of the fluid which is conveyed through the central, continuous bore 31 from the stationary into the rotating machine part or also vice versa can pass as a leak between the two sealing surfaces 2, 12, but is collected in the surrounding leakage space 25 and removed through a leakage space opening 26. Provided the fluid guided through the rotary transmission leadthrough is a liquid, the emerging leak quantity serves as a lubricant between the sliding sealing surfaces and/or as a coolant which partly removes the frictional heat forming between the sliding sealing surfaces. If fluid is supplied under pressure, the pressure drops continuously from inside to outside along the leak gap between the sliding sealing surfaces, but impacts both sliding sealing surfaces in opposite directions and thus contributes to the release of the frictional engagement so that the friction between the sliding sealing surfaces is thereby additionally reduced. Any pre-tensioning must in any case be sufficient to withstand the pressure of the fluid acting on the sealing surfaces.

For continuously satisfactory operation of the rotary transmission leadthrough it is particularly important that the two sliding rings are precisely positioned on their respective sliding ring supports and are held tight permanently in this position.

For this there is provided, as already mentioned, the two cap nuts 7 or 17 which are tightened with a defined torque on the external thread of the sliding ring supports and press the sliding ring 1 or 11 in question securely against the sliding ring supports 4 or 14 via the engagement of the conical surfaces 6, 8 or 16, 18.

Sliding ring, cap nut and all parts associated therewith will be further described below only in connection with the rotating machine part, provided reference is not expressly made to the side of the stationary machine part. As a result, there will be no references to all parts present in duplicate and the respective reference numbers allocated twice. Naturally however all the elements which are described with reference to the rotating machine part can also be present on the stationary machine part although they are not always necessary there to the same extent.

The shaft, serving as sliding ring support 4, of the rotating machine part has a so-called "labyrinth ring" 22 which, similar to the cap nut but before it is attached, is screwed on to the external thread of the shaft 4 and secured. This labyrinth ring 22 can moreover simultaneously serve as axial support for a shaft bearing and it is secured against rotation vis-a-vis the shaft 4, thus forming together with the shaft 4 a rotating unit. On its side facing the leakage chamber 25 this labyrinth ring 22 is broadened in the manner of a flange into a so-called ejector disk 20, which serves among other things to collect the liquid emerging between the sliding sealing surfaces 2, 12 and eject it radially outwards so that this liquid if possible reaches the outside wall of the leakage space 25 and from there can flow or be drawn off through the opening 26 and cannot emerge axially through the gap between ejector disk 20 and its external (stationary) enclosure and in the direction of the bearing of the shaft 4.

According to FIG. 1 and also some further versions this ejector disk 20 is also used for fixing a securing element 10 which in FIG. 1 specifically is in the form of a locking washer 10.

A top view of the locking washer 10 as fitted on the ejector disk 20 corresponding to a section A-A in FIG. 1 can be seen in FIG. 2 and FIG. 10, but the parts, surrounding the ejector disk, of the stationary, non-rotating machine part 50 have been omitted.

The central passage 31 surrounded by the sliding ring 1 can be seen in the centre, the section A-A being chosen such that it coincides with the transition between the two sealing surfaces 2, 12 with the result that in FIG. 2 the view is practically onto the sealing surface 2 of the sliding sealing ring 1. The cap nut 7 encloses with its conical internal surface the conical casing section of the sealing ring 1 and the cap nut 7 is for its part surrounded by the locking washer 10. The cap nut 7 has at two diametrically opposite sides a further two flattened sections 24 which can however just as well be designed as groove-shaped recesses in which the radially inwardly-projecting cam 27 of the locking washer 10 can engage, which is present in FIG. 10 on both sides.

The locking washer 10 consists for its part of an annular disk with preferably constant thickness and has distributed uniformly along its circumference three slots 33 each extending over a segment of somewhat more than 60°, one securing screw 23 each penetrating such a slot 33 and being screwed into the ejector disk 20. As already mentioned, the locking washer 10 has a radially inwardly-projecting cam which engages in a corresponding recess or flattened section 24 of the cap nut 7. Expediently the locking washer has, as shown in FIG. 2, two identical, diametrically opposite cams 27 which simultaneously engage in the corresponding, opposite recesses or flattened sections 24 of the cap nut 7. The result of the design with two diametrically opposite cams 27 according to FIG. 10 is that the locking washer is balanced, i.e. upon rotation it displays no imbalance whatsoever which could result in disadvantageous vibrations or even damage. The three slots 33 are also designed symmetrical with the result that the balanced state of the locking washer is also maintained thanks to the provision of these three slots. It is understood that the symmetrical design of the locking washer, the individual elements of which in the present example have either a two-fold (relative to the cam) or a three-fold (relative to the slots) axis of symmetry, leads to a locking washer that is balanced overall only if the locking washer also has a uniform thickness and is made of a homogeneous material. However, a locking washer 10 designed thus (FIG. 10) as a whole has no multiple axis of symmetry as it can be copied identically onto itself only after rotating by at least 360°, whereas for individual geometric features of the locking washer (cam or slots) this is the case in each case after rotations by 180° and 120° respectively.

All other rotating parts are also either fully rotation-symmetrical or have a two-, three-fold or multiple axis of symmetry with the result that all rotating parts are balanced overall. This also applies in particular to the ejector disk which has three threaded bores for the three securing screws 23 all of which lie exactly on a circle with a uniform radius and have a relative angle distance of 120° relative to one another.

This design of the ejector disk 20 in conjunction with the slots 33 of the locking washer makes it possible to adapt the locking washer 10 to any desired angle position of the cap nut 7 with the result that the two opposite cams 27 (only one of which is shown in FIG. 2) engage in the corresponding recesses or flattened sections 24 on the opposite sides of the cap nut 7.

FIGS. 3 to 8 will be described below only in relation to the elements which differ from the elements already described in connection with FIG. 1, 2 or 9. All other parts, even if they are no longer expressly identified by reference numbers, are identical to those in FIG. 1.

A variant is shown in FIG. 3 in which the cap nut 7 is secured by a counter-nut 34 enclosing the cap nut. For this purpose the cap nut 7 has an external thread and the counter-nut 34 has a corresponding internal thread. Once the cap nut has been screwed onto the thread of the sliding ring support 4 (to apply an appropriate torque the end surface of the cap nut 7 can for example have corresponding engagement bores for pins of a torque wrench), the counter nut 34 is screwed onto the external thread of the cap nut 7 until it engages with the base of a recess in the ejector disk 20 and rests against the ejector disk 20 likewise screwed securely on the shaft 4. The desired counter-effect is achieved between the external thread of the cap nut 7 and the internal thread of the counter nut 34.

FIGS. 4 and 4a shows a variant which is very similar to the variant shown in FIG. 1, the locking washer in this specific case differing from the locking washer according to FIGS. 1 and 2 only in that it has no cam 27 for engaging with the cap nut 7 and the cap nut 7 also has no recesses or flattened sections 24, but instead the securing ring 10' engages, with two inwardly-projecting lips which define a smaller internal diameter than corresponds to the external diameter of the cap nut 7, with the outside of the cap nut 7 and secures the latter against rotation or detachment from the thread of the sliding ring support 4 as a result of the corresponding frictional engagement.

It is understood that, in this case also, the locking washer 10' is again secured to the ejector disk 20 by three screws 23 distributed evenly over the circumference, but in this case the locking washer need not have any slots 33 whatsoever, as the locking washer 10' can be fitted in any chosen angle positions relative to the cap nut 7.

FIG. 5 shows a further variant of the securing of the cap nut 7. In this case the internal surface of the cap nut has in or in the vicinity of its thread area a recess into which a displacement element 35, which can consist for example of plastic, is inserted. Simultaneously also provided in the cap nut 7 is an axial threaded bore 36 which crosses or overlaps with the recess provided for the displacement element 35 and is screwed into the one stud bolt 37. By screwing the stud bolt 37 into the threaded bore 36, the displacement element 35 can, once the cap nut 7 has been screwed onto the thread of the sealing ring support 4, be pressed radially inwards and into engagement with the thread of the sliding ring support with the result that the cap nut 7 is in this way secured to the thread.

FIG. 6 shows a variant in which the cap nut 7 has a radial threaded bore in its wall in the threaded area and is secured on the thread of the sliding ring support 4 by a corresponding radial stud bolt 38.

FIG. 7 shows a version which can be regarded as a mixture of the variants according to FIGS. 5 and 6. In this case a radial bore is provided for the introduction of a displacement element 35' in the wall or the casing of the cap nut 7, and equally an axial threaded bore in which a stud bolt 37 engages and which crosses the radial bore for the housing of the displacement element 35'. Here also, the element 35' is at least partly displaced radially inwards and into engagement with the thread of the sliding ring support 4 by axial screwing-in of the stud bolt 37.

Finally FIG. 8 shows a variant with a pointed bar 39 which is secured to a threaded bolt 41 extending across the bar. The pointed bar 39 is sufficiently narrow not to engage with the external thread of the sliding ring support 4 in a position rotated by 90° (about the axis of the threaded bolt 41) vis-à-vis the view in FIG. 8. Once the cap nut 7 is screwed tight on the thread of the sliding ring support 4 with a defined torque the threaded bolt 41 with the bar 39 secured thereto is introduced into an axial bore in the wall or in the casing of the cap nut 7 and the free end of the threaded bolt 41 which projects somewhat out of the axial bore in the cap nut is provided with a suitable screw nut. The pointed bar 39 is then rotated into its engagement position shown in FIG. 8 with the thread of the sliding ring support 4 and the nut is then screwed tight at the end of the threaded bolt in order to thus clamp the bar 39, engaging with the thread, securely to the thread or achieve an effect similar to a counter-nut, but limited to a small thread area only.

It is understood that, in particular in the versions of FIGS. 5, 6, 7 and 8 in which additional radial or axial bores or recesses are provided in the wall of the cap nut 7, corresponding balancing bores or recesses can be provided symmetrically distributed along the circumference of the cap nut 7 in its wall in order to obtain a cap nut 7 that is balanced vis-à-vis the axis of rotation 30.

The cap nut 17 at the sliding ring support 14 of the stationary machine part 50 (see FIG. 1) can in principle be secured in the same way as the cap nut 7 at the rotating machine part, but it is also possible in the case of the stationary machine part to use for example a single locking pin or a locking washer 29 which engages in one of preferably several recesses distributed over the circumference of the cap nut 17. In particular the cap nut 17 need in particular not necessarily be balanced because it is secured to the stationary machine part 50 and does not rotate. It is understood that the variant, shown in FIG. 1, of the securing of the nut 17 with a pin 29 is only one of many different possibilities for anti-rotation protection and moreover also many of the anti-rotation devices on the rotating part described with respect to FIGS. 1 and 8 could also be provided.

For the purpose of original disclosure it is to be noted that any features which may be gathered by a skilled person from the present description, the drawings and the claims, even if only described in connection with particular further features, may be combined individually as well as in arbitrary combinations with any other of the features or groups of features disclosed herein, unless this is explicitly excluded or technical conditions would render such combinations impossible or senseless. The comprehensive, explicit discussion of any combinations of features which might be thought of is dispensed with herein just for the sake of brevity and legibility of the description and claims.

The invention claimed is:

1. Device for a sliding ring seal of an axial rotary transmission leadthrough, comprising:
   a) a sliding ring which has a sliding ring sealing surface and a first contact surface facing away from the sliding ring sealing surface
   b) a sliding ring support with a second contact surface for a tight connection with the first contact surface of the sliding ring and
   c) a holding apparatus for the sliding ring which holds the first and the second contact surfaces in tight connection with each other,
wherein
   d) the sliding ring has a casing surface which, starting from the first contact surface, runs conically tapered towards the sliding ring sealing surface,
   e) the holding apparatus is designed as a cap nut which has a threaded section and a holding section which has a conically running internal surface which is designed complementary to the casing surface of the sliding sealing ring, and
the sliding ring support having an end section with an external thread matching the threaded section of the cap nut.

2. Device according to claim 1, wherein the sliding ring is made of a ceramic material.

3. Device according to claim 1, wherein the sliding ring is made of a metal material.

4. Device according to claim 3, wherein the metal material is a hard metal.

5. Device according to one of claims 1 to 3, wherein the sliding ring and the holding apparatus share a central axis and the casing surface and the internal surface of the holding section of the cap nut relative to the central axis is between 3° and 15°.

6. Device according to one of claims 1 to 3, further comprising an anti-rotation device engaging the cap nut.

7. Device according to claim 6, wherein the anti-rotation device is an annular locking washer surrounding the cap nut and in blocking engagement with the cap nut, the annular locking washer being secured to an element connected to the sliding ring support and the element annularly enclosing the end section of the sliding ring support.

8. Device according to claim 7, wherein the cap nut has a recess in which a radially inwardly-projecting projection of the locking washer engages.

9. Device according to claim 7, wherein the locking washer is in frictional engagement with the outer surface of the cap nut.

10. Device according to claim 7, wherein the locking washer has a locking washer central axis and is balanced in respect of rotations about the locking washer central axis.

11. Device according to claim 10, wherein the locking washer is made of a homogeneous, sheet-like or lamellar material and all the geometric elements of the locking washer that deviate from a full rotation symmetry have an at least two-fold axis of symmetry which coincides with the locking washer central axis.

12. Device according to one of claims 1 to 3, further comprising a counter-nut which is screwed onto an external thread of the cap nut and rests against an element enclosing the sliding ring support.

13. Device according to one of claims 1 to 3, wherein the cap nut has a recess into which a plastic element is inserted, the cap nut has an axial bore which intersects with the recess, and the axial bore being provided with an internal thread into which a stud bolt can be screwed which, to secure the cap nut, presses the element inserted into the recess radially inwards.

14. Device according to one of claims 1 to 3, wherein the cap nut is provided with a cross-bore with an internal thread into which a stud bolt can be screwed which, to secure the cap nut, is screwed into engagement with the external thread of the sliding ring support.

15. Device according to one of claims 1 to 3, wherein the cap nut has a cross-bore and an axis-parallel threaded bore, and a clamping element housed in the cross-bore, and wherein the clamping element is pressed radially inwards against the external thread of the sliding ring support by a stud bolt screwed into the axis-parallel threaded bore.

16. Device according to claim 15, wherein said clamping element is made of plastic.

17. Device according to one of claims 1 to 3, wherein an axial tension bolt is provided with a pointed bar extending transversely from one end of the bolt, the axial tension bolt extending through an axial bore in the wall of the cap nut, the pointed bar being able to be brought into engagement with the external thread of the sliding ring support and the tension bolt capable of being fixed by a counter-nut.

18. Device according to one of claims 1 to 3, wherein the sliding ring and the holding apparatus share a central axis, and the casing surface and the internal surface of the holding section of the cap nut relative to the central axis is between 5° and 10°.

19. Device according to claim 1, wherein the sliding ring is made of carbon/graphite-based materials.

20. Device according to claim 1, wherein said sliding ring is unitary.

* * * * *